United States Patent
Rashidi

(10) Patent No.: US 6,375,096 B1
(45) Date of Patent: Apr. 23, 2002

(54) TWO COMPONENT SPRAY GUN AND NOZZLE ATTACHMENT

(75) Inventor: Majid Rashidi, Pepper Pike, OH (US)

(73) Assignee: Cleveland State University, Cleveland, OH (US)

( * ) Notice: Subject to any disclaimer, the term of this patent is extended or adjusted under 35 U.S.C. 154(b) by 0 days.

(21) Appl. No.: 09/516,979

(22) Filed: Mar. 1, 2000

(51) Int. Cl.[7] ............................. B05B 7/12; B05B 7/06; F23D 11/46
(52) U.S. Cl. ..................... 239/413; 239/414; 239/417.5; 239/432
(58) Field of Search ............................ 239/413, 417.5, 239/432, 407, 398, 414; 251/205

(56) References Cited

U.S. PATENT DOCUMENTS

| | | | |
|---|---|---|---|
| 2,705,829 A | * 4/1955 | Mock | 251/205 |
| 2,890,836 A | 6/1959 | Gusmer et al. | 239/117 |
| 2,956,400 A | 10/1960 | Ferri | 60/35.6 |
| 3,096,001 A | 7/1963 | Boe et al. | 222/135 |
| 3,176,922 A | 4/1965 | Decker | 239/112 |
| 3,191,730 A | 6/1965 | Fischer | 189/88 |
| 3,558,051 A | 1/1971 | Strickler et al. | 219/1 |
| 3,559,890 A | 2/1971 | Brooks et al. | 239/304 |
| 3,633,795 A | 1/1972 | Brooks | 222/134 |
| 3,690,556 A | 9/1972 | McCain | 239/112 |
| 3,784,110 A | 1/1974 | Brooks | 239/304 |
| 3,795,364 A | 3/1974 | Kattner | 239/8 |
| 3,837,575 A | 9/1974 | Lehnert | 239/112 |
| 3,933,312 A | 1/1976 | Fries | 239/413 |
| 3,976,248 A | 8/1976 | Middleton, Sr. | 239/416.1 |
| 4,023,733 A | 5/1977 | Sperry | 239/112 |
| 4,079,868 A | 3/1978 | Moniot | 222/591 |
| 4,083,474 A | 4/1978 | Waite et al. | 222/145 |
| 4,117,551 A | 9/1978 | Brooks et al. | 366/162 |
| 4,133,483 A | 1/1979 | Henderson | 239/118 |
| 4,193,546 A | 3/1980 | Hetherington et al. | 239/112 |
| 4,245,816 A | * 1/1981 | Johnson | 251/282 |
| 4,262,847 A | 4/1981 | Stitzer et al. | 239/112 |
| 4,262,848 A | 4/1981 | Chabria | 239/112 |
| 4,280,390 A | 7/1981 | Murray | 411/542 |
| 4,311,254 A | 1/1982 | Harding | 222/145 |
| 4,350,298 A | 9/1982 | Tada | 239/333 |
| 4,377,256 A | 3/1983 | Commette et al. | 239/117 |
| 4,399,930 A | 8/1983 | Harding | 222/145 |
| 4,404,984 A | * 9/1983 | Jones | 137/88 |
| 4,427,153 A | 1/1984 | Schaerer | 251/117 |
| 4,453,670 A | 6/1984 | Sirovy | 239/117 |
| 4,458,831 A | 7/1984 | Holleran et al. | 222/134 |
| 4,496,081 A | 1/1985 | Farrey | 222/135 |
| 4,498,626 A | 2/1985 | Pitchford | 239/230 |
| 4,516,694 A | 5/1985 | Finn | 222/148 |
| 4,529,126 A | 7/1985 | Ives | 239/412 |
| 4,550,863 A | 11/1985 | Farrey | 222/145 |
| 4,603,813 A | 8/1986 | Luegering | 239/399 |
| 4,616,859 A | 10/1986 | Brunet | 285/317 |
| 4,643,336 A | 2/1987 | Mandeville et al. | 222/145 |
| 4,676,437 A | 6/1987 | Brown | 239/304 |
| 4,708,292 A | 11/1987 | Gammons | 239/414 |
| 4,762,253 A | 8/1988 | Palmert | 222/145 |

(List continued on next page.)

Primary Examiner—Henry C. Yuen
Assistant Examiner—Davis Hwu
(74) Attorney, Agent, or Firm—John F. McDevitt

(57) ABSTRACT

The present invention relates to polyurethane foam spray guns and disposable, attachable nozzles. The spray gun has at least two barrels and metering chambers containing continuous passageways defined by inner bores. Each inner bore can have at least one ramp-shaped slot for controlled metering of a resin. Within each barrel and metering chamber is a plunger. At the front end of the plunger but not the tip is an O-ring that aids in the control of the metering of each resin. At the mid-section of the plunger is at least one O-ring that aids in the prevention of leakage within the spray gun. Both the plunger tip and the discharge opening of each barrel/metering chamber are narrowed/conical. The nozzle contains a one-way valve to prevent the crossover of the resins. The nozzle's tip has different shapes depending on the structure of the foam product desired.

20 Claims, 7 Drawing Sheets

U.S. PATENT DOCUMENTS

| | | | |
|---|---|---|---|
| 4,838,458 A | 6/1989 | Davidson | 222/135 |
| 4,867,346 A | 9/1989 | Faye et al. | 222/145 |
| 4,901,888 A | 2/1990 | Standlick | 222/145 |
| 4,913,317 A | 4/1990 | Wernicke | 222/145 |
| 4,925,107 A | 5/1990 | Brown | 239/414 |
| 4,927,079 A | 5/1990 | Smith | 239/11 |
| 4,955,544 A | 9/1990 | Kopp | 239/304 |
| 4,993,596 A | 2/1991 | Brown | 222/145 |
| 5,027,975 A | 7/1991 | Keske et al. | 222/1 |
| 5,040,728 A | 8/1991 | Zwirlein, Jr. et al. | 129/116 |
| 5,050,776 A | 9/1991 | Rosenplanter | 224/146.5 |
| 5,053,202 A | 10/1991 | Dwyer et al. | 422/138 |
| 5,069,881 A | 12/1991 | Clarkin | 422/135 |
| 5,074,470 A | 12/1991 | Rosenplanter et al. | 239/176 |
| 5,090,814 A | 2/1992 | Petcan | 366/177 |
| 5,092,492 A | 3/1992 | Centea | 222/137 |
| 5,104,006 A | 4/1992 | Brown | 222/145 |
| 5,129,581 A | 7/1992 | Brown et al. | 239/414 |
| 5,203,045 A | 4/1993 | Golston | 8/156 |
| 5,242,115 A | 9/1993 | Brown | 239/414 |
| 5,246,143 A | 9/1993 | Chertano | 222/145 |
| 5,265,761 A | 11/1993 | Brown | 222/1 |
| 5,299,740 A | 4/1994 | Bert | 239/117 |
| 5,323,963 A | 6/1994 | Bally | 239/63 |
| 5,336,014 A | 8/1994 | Keller | 403/24 |
| 5,339,991 A | 8/1994 | Snyder | 222/136 |
| 5,348,230 A | 9/1994 | Mullen et al. | 289/428 |
| 5,429,308 A | 7/1995 | Brown | 239/414 |
| 5,429,840 A | 7/1995 | Raterman et al. | 417/256 |
| 5,462,204 A | 10/1995 | Finn | 222/137 |
| 5,477,988 A * | 12/1995 | Gerich | 239/414 |
| 5,570,822 A | 11/1996 | LeMarbe et al. | 222/459 |
| 5,575,424 A | 11/1996 | Fleischmann | 239/436 |
| 5,642,860 A | 7/1997 | Bush et al. | 239/333 |
| 5,645,199 A | 7/1997 | Schnitzler | 222/567 |
| 5,683,544 A | 11/1997 | Kopp | 156/578 |
| 5,791,522 A | 8/1998 | Lee et al. | 222/145.5 |
| 5,799,876 A | 9/1998 | Isler | 235/306 |
| 5,819,988 A | 10/1998 | Sawhney et al. | 222/137 |
| 5,820,353 A | 10/1998 | Beylich et al. | 417/198 |
| 5,897,142 A | 4/1999 | Kulevsky | 285/308 |
| 5,988,532 A | 11/1999 | Alt et al. | 239/414 |

\* cited by examiner

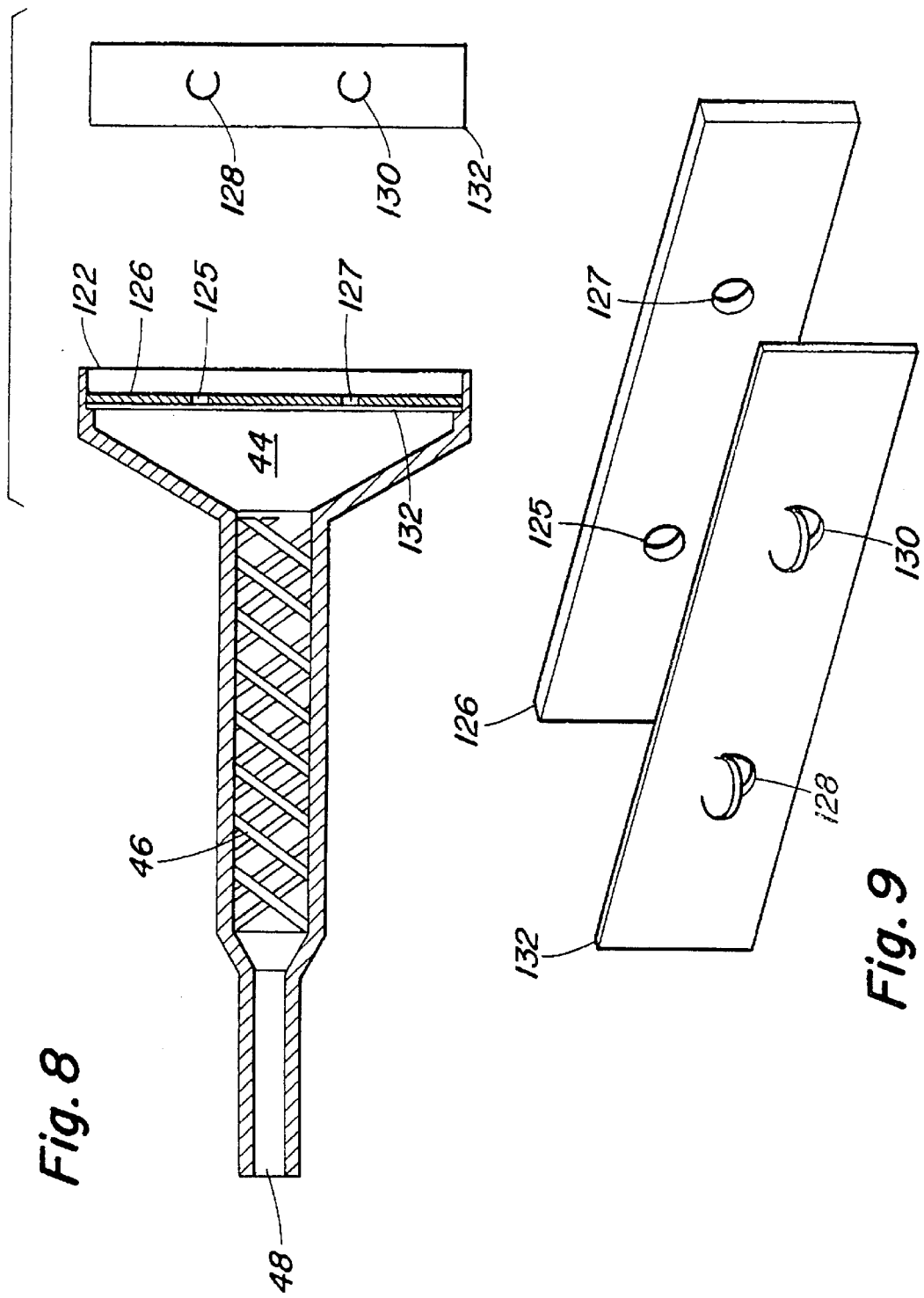

TWO COMPONENT SPRAY GUN AND NOZZLE ATTACHMENT

DISCLOSURE OF THE INVENTION

The present invention, generally, relates to improvements to spray guns and nozzle attachments and, in particular, to foam spray guns adapted to have controlled metering of at least two components, and to disposable attachable nozzles adapted to prevent crossover of chemically reactive fluids.

BACKGROUND OF THE INVENTION

Polyurethane foams are utilized for packaging, insulation, and in shaping and coating of articles. Two or more chemically reactive fluid resins under pressure pass through separate channels of a spray gun, eventually, are allowed to mix in a mixing chamber of a nozzle from which the resultant foam product. polyurethane, is dispensed. The two resins, "A" and "B", each have a different viscosity. Resin "A", polymeric isocyanate, is about twice as viscous as resin "B", polyol amine, and, thus, resin "A" exhibits a higher resistance to flow under the same flow conditions compared to resin "B."

Under pressure, each of the two liquid resins passes separately into the different channels within the spray gun. Each channel has a plunger/needle which when urged forward by a coiled spring prevents the passage of either resin out of the inlet ports and out of discharge openings of tie spray gun. When a trigger is pulled, coiled springs are compressed, plungers move rearward thereby allowing each liquid resin to pass out each inlet port into its respective channel around its respective plunger and out its respective discharge opening into a nozzle. There is no dispensing of the more viscous resin at low metering rates when the trigger of the gun is only slightly depressed. On the other hand, there is good dispensing at high dispensing rates of both resins when the trigger of the gun is depressed completely. This, the difference in viscosity between the two resins influence the relative flow rates at low dispensing rates. This difference at low dispenses rates, concomitantly, results in poor expanding and curing of the polymer, an off-ratio resin flow into the nozzle. A standard needle valve spray gun is disclosed in U.S. Pat. Ser. No. 5,462,204 to Clifford J. Finn.

When liquid resin "A" and liquid resin "B" are mixed together in the proper amounts in a thorough manner, a polymerization reaction occurs. The resultant settable polymer product can harden, clog and block channels of the gun, thus, the two resins are kept separate and apart within different channels of the gun and are only allowed to mix after passing into the nozzle before being dispensed.

The two components are suppose to be under the same pressure, however, practically, it is not possible to maintain the same pressure in the reservoir tanks of resin "A" and "B." Under certain conditions, the component with the higher pressure can crossover and contaminate the component with the lower pressure leading to formation of clogs.

In addition, once dispensing of the polymer ceases, any polymer remaining in the nozzle will harden, clog if exposed to air and moisture, block and prevent the reuse of the nozzle.

While each of the resins is tinder pressure within its channel there can be leakage problems within the spray gun and there can be leakage problems at the connection between the nozzle and tile spray gun.

Accordingly, to overcome the disadvantages of the prior art spray guns and nozzle attachments, it is an object of the present invention to provide a controlled metering system for a range of metering rates from low to high rates and to prevent crossover of either resin.

It is another object of the present invention to provide a seal means to aid in the metering of each resin.

It is still another object of the present invention to provide a seal means to prevent leakage of the It is still another object of the present invention to provide a seal means to prevent leakage of the resins while the resins are under pressure.

It is a further object of the present invention to provide a means for preventing the leakage of either resin rearward within the spray gun.

It is still another object of the present invention to provide a configuration to both the tip of the plunger and of the discharge opening of the spray gun to prevent air or moisture from reacting with either resin and clogging its respective channel.

It is a further object of the present invention to provide a means of preventing resin crossover within the nozzle.

It is another object of the present invention to provide a means to seal the nozzle to the discharge opening of the spray gun to prevent leakage of the resins at the connection.

It is still another object of the present invention to provide an attachment means for securing the nozzle to the spray gun to prevent any leakage.

It is yet still another object of the present invention to provide a quick and easy means of attaching/detaching the nozzle to the spray gun.

SUMMARY OF THE INVENTION

The invention provides both for a dispensing gun having a ramp-shaped slot on each resin passageway's inner bore for controlled metering of each resin and for a nozzle attachment having two identical one-way valves within its inlet opening to prevent resin crossover.

In its broader aspects, the spray gun of the present invention is a body consisting of a trigger, a first and a second longitudinal barrel, and a first and a second longitudinal metering chamber forward of each of the barrels and secured thereto. Within each of the first and second barrels and each of the first and second metering chambers are continuous first and second longitudinal passageways. The first and second passageways are defined by continuous first and second inner bores within the barrels and the metering chambers. Within the passageways are a first and a second inlet port connected to sources of a first and a second resin, and within tile first and second passageways are a first and a second plunger to individually meter the first and second resin. A spring is around each of the first and second plungers to urge the first and second plunger to a closed position. A ramp-shaped slot is disposed into the first and second inner bores for controlled metering of the resins.

In its broadest aspects, there is a nozzle attachment to a foam-dispensing gun. The nozzle has two one-way valves to prevent any crossover of resins. The nozzle has a mixing chamber for mixing the resins. The nozzle has an inlet opening for receiving each of the resins and an outlet opening for dispensing the reaction product of mixing the resins in the mixing chamber.

In its broadest aspects, the combination of the gun and the nozzle attachment include a body consisting of a trigger, a first and a second longitudinal barrel, and a first and a second longitudinal metering chamber forward of each of the barrels and secured thereto. Within each of the first and second barrels and each of the first and second metering chambers are continuous first and second longitudinal passageways. The first and said second passageways are defined by continuous first and second inner bores of the barrels and the metering chambers. Within the passageways are a first and a second inlet port connected to sources of a first and a second resin. Within the first and second passageways are a first and a second plunger to individually meter the first and second resin. A spring is around each of the first and second plungers to urge the first and second plunger to a closed position. A ramp-shaped slot is disposed into the first and second inner bores for controlled metering of the resins. A nozzle has an inlet opening for receiving each of the resins from the gun, an outlet opening for dispensing a polyurethane foam from the nozzle, a mixing chamber and two one-way valves to prevent crossover of the resins within the gun.

The various features and advantages of the invention will become more apparent from the detailed description of a preferred embodiment of the invention when considered along with the accompanying drawings.

BRIEF DESCRIPTION OF THE DRAWINGS

FIG. 8 is a schematic of top section view of a one-way valve within the nozzle and a front view of the one-way valves of a second embodiment:

FIG. 9 is a perspective view of a second embodiment of the one-way valve:

BEST MODE FOR CARRYING OUT THE INVENTION

Figure 1:
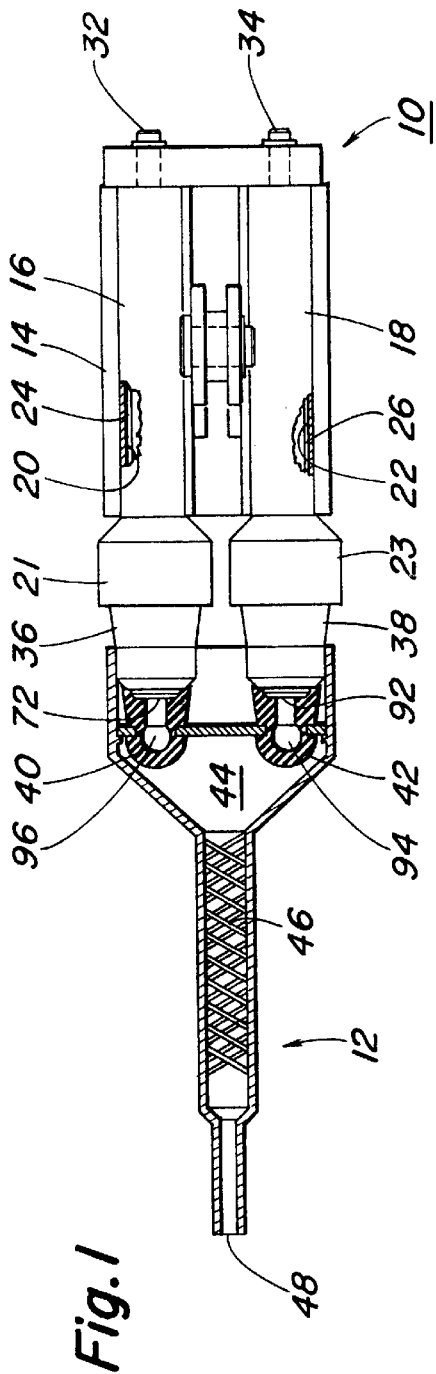
FIG. 1 is a schematic of top section of the present invention.

Referring to FIG. 1, the present invention consists of improvements to a spray gun, 10, and a disposable nozzle attachment 12. Gun, 10, has a body, 14, for housing a first longitudinal barrel, 16, and a second longitudinal barrel, 18. The first barrel, 16, and the second barrel, 18, have longitudinal inner bores, 20 and 22. Each inner bore, 20 and 22, and barrel, 16 and 18, define a first and second longitudinal passageway, 24 and 26. Leading into tile first passageway, 24, is a first inlet port, 28, (not shown) and leading into the second passageway. 26, is a second inlet port, 30, (not shown). Attached to each inlet port, 28 and 30, are pressurized resins "A " and "B" by way of hoses (not shown). The resins are liquids and, at least, resin "A" can harden upon exposure to air and/or water. Within each passageway. 24 and 26, is an axially moveable plunger, 32 and 34. The plungers having a very close fit to their respective cylindrical bores, FIG. 2, comprise the main structures of the metering assembly. Forward of each barrel, 16 and 18, and attached thereto are a first and a second metering chamber. 36 and 38. The nozzle, 12, is attached to the metering chambers. 36 and 38. Within the nozzle, 12, are first and second one-way valves, 40 and 42, for receiving each resin from the metering chambers, 36 and 38 and preventing crossover of each of the resins because of the difference in pressure within the interior of the valves and the exterior of the valves. Forward of the one-way, 40 and 42, is a mixing chamber, 44, for mixing resin "A" and resin "B" in the proper amounts and thoroughly to form a settable polymer. Forward of the mixing chamber, 44, is a static mixer, 46, and forward of the static mixer, 46, is a nozzle discharge opening, 48, for dispensing the polymer from the nozzle, 12. The spray gun body, nozzle, trigger and handle (not shown) can be molded out of a durable plastic material. The plungers, 32 and 34, can be manufactured from metal, brass or steel, or a high durometer plastic. The barrels, 16 and 18 can be manufactured from metal or rigid plastic. The one-way valves, 40 and 42, if dome-shaped, can be manufactured from a low durometer material. e.g., rubber.

Figure 2:
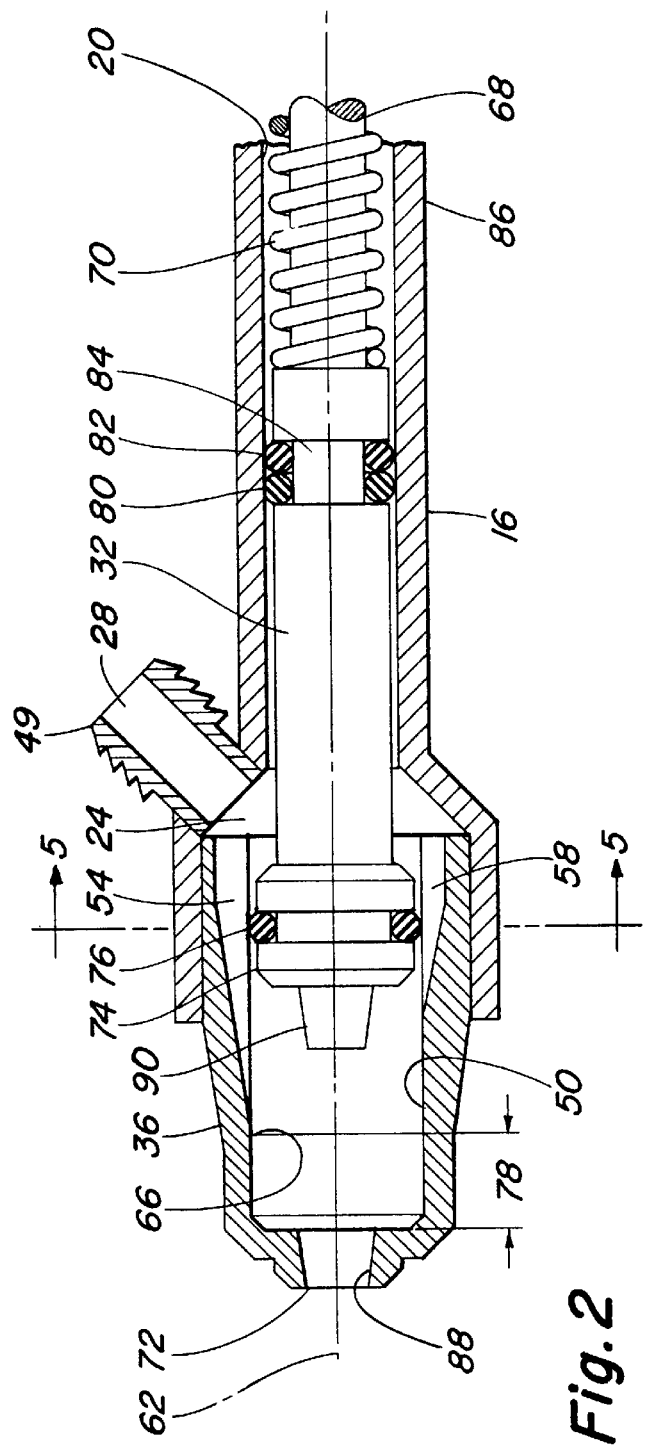
FIG. 2 is a schematic of side section of a metering chamber and pan of a barrel of a spray gun.
Figure 3:
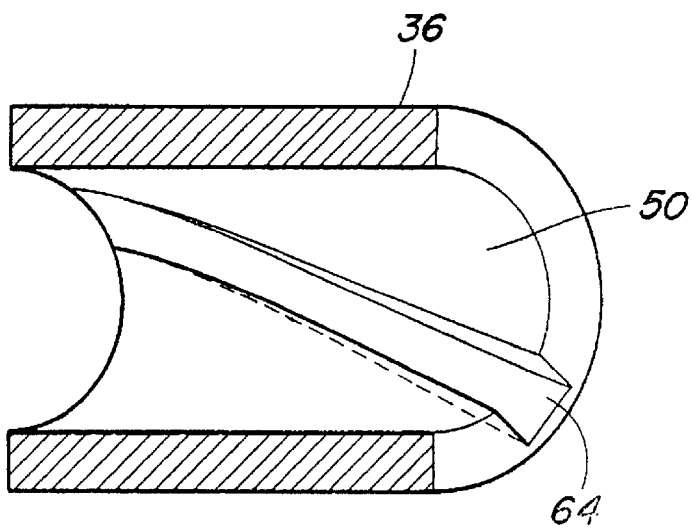
FIG. 3 is a perspective view of a ramp-shaped rifled metering slot in the metering chamber.
Figure 4A:
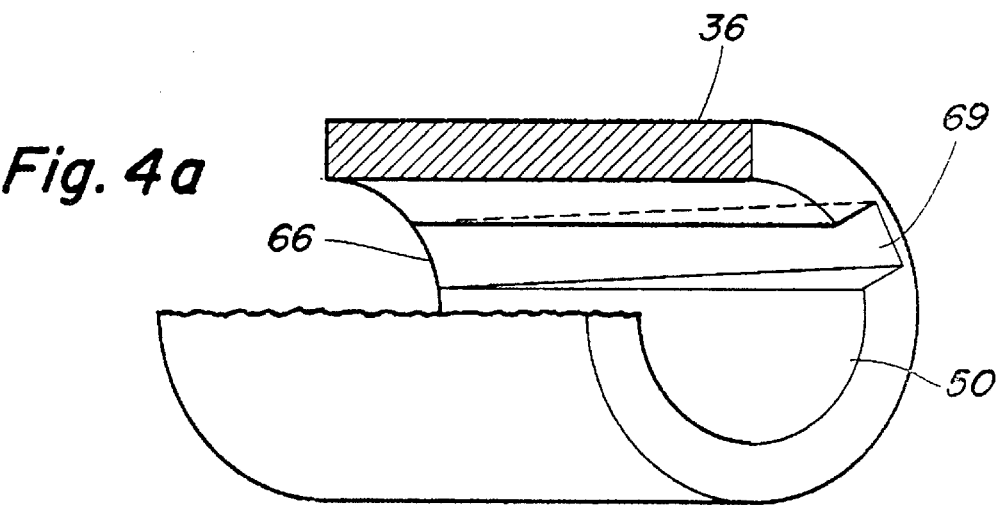
FIG. 4 is a perspective view of the ramped-shaped straight metering slot with constant slot width in the metering chamber and with variable slot width in the metering chamber.
Figure 4B:
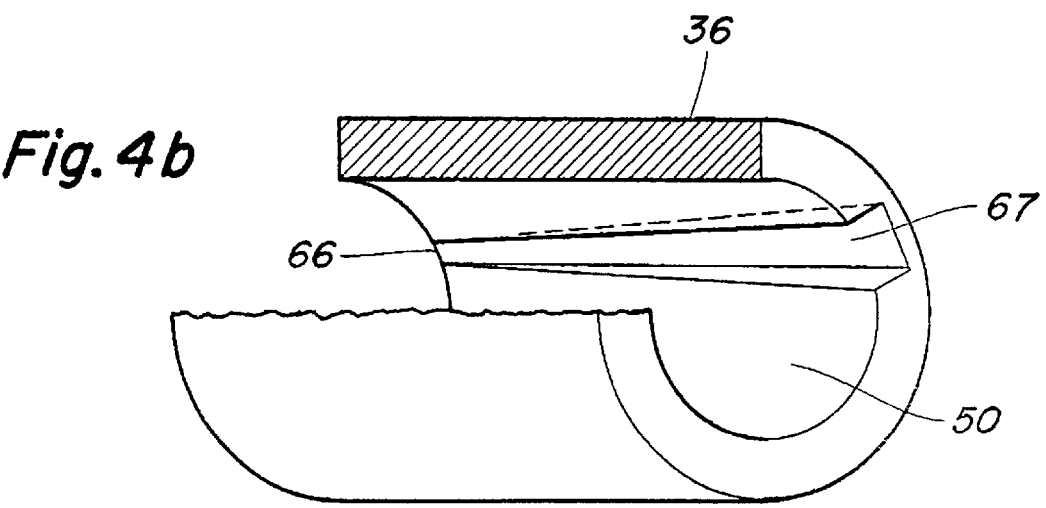

FIG. 2 illustrates a schematic view of one metering chamber, e.g., 36, and barrel, 16, of the spray gun, 10. Although only one metering chamber and barrel of the spray gun are illustrated, there are two barrels and two metering chambers. One of the resins, either "A" or "B", under pressure, passes from the inlet port, 28, into passageway, 24. The resins are kept separate and apart in the different passageways until they are allowed to mix in the mixing chamber, 44, within the nozzle, 12. Secured to the barrel, 16, is the metering chamber, 36. The structure of the passageway, 24, is continuous and circumferential through the barrel, 16, and tile metering chamber, 36, and defined by the inner bores, within the barrel. 16, and the metering chamber, 36. Disposed into a portion of the inner bore, 50, of the metering chamber. 36, is a ramp-shaped slot, 54. There can be more than one ramp-shaped slot disposed into the inner core, 50, of the metering chamber, 36. When there is more than one slot, the slots are staggered, compare slots 54 and 58. When there is a second slot, e.g., 58, the second slot, 58, is shorter than the first slot, 54. The slots can either be axially straight along a longitudinal axis, 62, e.g., 54 and 58, or spirally winding, or rifled, FIG. 3, 64, into the inner bore, 50, of the metering chamber, 36. The ramp-shaped slot controls tile metering of the resin for the full range of flow rates. At the beginning of the straight ramp-shaped slot, 66, the depth is zero. The ramp-shaped slot increases slowly in height from zero to a height/depth of about 0.050 inches and a constant width is maintained 69, i.e., a variable height/depth and constant width, FIG. 4a. The straight ramp-shaped slot increases slowly in height to a height of about 0.050 inches and slowly increases in width from a width of 0.030 inches to a width of 0.040 inches. i.e., a variable height and a variable width, 67. FIG. 4b. The ramp-shaped slot for the more viscous resin can be larger and wider than the ramp-shaped slot for tile less viscous resin. The width of the ramp-shaped slot is about 0.030 to about 0.040 inches.

Figure 5:
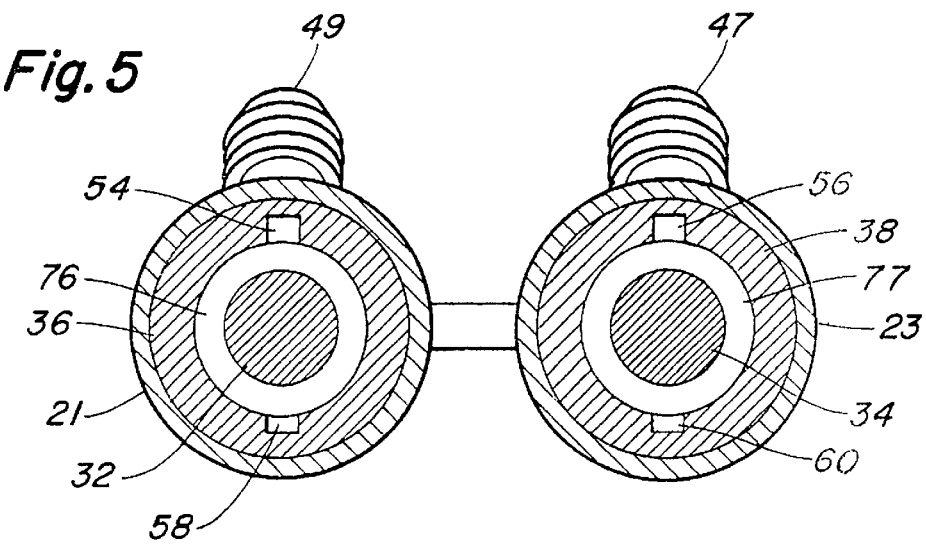
FIG. 5 is a schematic of a front section view of the metering chamber having two variable width ramp-shaped slots in each metering chamber.

FIG. 5 illustrates a cross-section of each barrel, 16 and 18, and each metering chamber, 36 and 38, along line 5—5 in FIG. 2. Moving inward toward the plungers, 32 and 34, there are the barrels, 21 and 23, the passageways, 24 and 26, not shown and behind O ring 76 and slots, 54 and 58, and 56 and 60.

Referring back to FIG. 2, at the back end, 68 of plunger, 32, is a coiled metal spring, 70. The plunger is spring loaded to push against a discharge opening, 72, of the metering chamber, 36. At the front end, 74, of the plunger, 32, is a seal or an O-ring. 76, to aid in the controlled metering of the resin and to keep the discharged opening, 72, sealed at the front end when the gun is not in use. There is an axial distance, 78, between the beginning of the slot. 66, and the discharge opening. 72, of the metering chamber. 36. When the plunger, 32, fits within the discharge opening, 72, the closed position of the metering chamber, and the front O-ring, 76, is within the axial distance, 78, full circumferential contact between the O-ring and the inner bore, 50, of the metering chamber occurs. This prevents the resin from leaking from the discharge opening, 72, of the gun. The plungers can be pulled back by a trigger mechanism, not shown, in FIG. 2, before the front O-ring, 76, reaches the beginning, 66, of the slot 54, and looses full circumferential contact within the inner bore, 50. In this position, resin begins to flow into the slot. At first, with the plunger slightly pulled back, the opening available for resin flow is relatively small. This is because the initial depth of the slot is very small, see FIG. 4. As the plunger is pulled back further and further, the resin flow becomes larger and larger as both the first slot and then the second slot in the metering chamber, if there is a second one, are used. The flow rate through the front discharge opening of the gun slowly increases, dispensing position. By using both the front O-ring and the slot(s) there is control over the amount of each resin dispensed from the gun from a low to high flow rate and in between. One advantage of the rifled slot, 64, (shown in FIG. 3) over the axial straight slots 67 or 69 (shown in FIGS. 4a and 4b) 50, is a reduction on the wear of the front O-ring, 76, (see FIG. 2) from all movement of the plunger within the metering chamber.

One or more seals or O-ring(s), 80 and 82, are located at the mid-section, 84, of the plunger, 32, (FIG. 2) to prevent leakage of either pressurized resin toward the back end, 86, of the barrel, 16. The mid-section O-rings, 80 and 82, fit securely between the plunger, 32, and inner bore, 20, of the barrel, 16. By having the need for both a front O-ring and one or more mid-section O-ring(s), it becomes clear that there are opposing forces exerted to each plunger because of the presence of pressurized resins in the barrels. If the net cross-sectional area of the front-end seal is larger than that of the back-end seal, the internal pressure tends to keep the gun closed. In other words, in this case the internal pressure tends to push the plunger forward which is a desirable feature because it tends to push the plunger forward and prevents air and moisture entrance into the gun. FIG. 2 shows the front O-ring being bigger than the back seal. O-ring(s). This will assure that the internal pressure of the gun always tends to keep the gun sealed at the front end when the gun is not in use. All O-rings are elastomeric.

In order to seal the gun when it is not in use and to prevent air or moisture from contacting and crystallizing any residual resin, the discharge opening, 72, of the metering chamber, 36, is narrow and conical 88. The tip, of the plunger, 32, is narrow and conical, 90, in order that the tip fit snugly within the conical, 88, discharge opening, 72, when the plunger, 32, is in a closed position or non-dispensing position. The plungers, 32 and 34, have the same diameter therethrough except for the narrow conical tip and the wide area where the front O-ring is positioned. The stroke of the plunger is designed to be about 0.50 inches in order to operate the plunger of the gun from a fully closed position to a fully opened position. This allows the operator to have a firm control over the dispensing from a low to a high dispensing rate. In addition, the trigger, not shown provides a 0.50 inch plunger stroke through a 45 degree rotation about a pivot point. This rotation is achieved through the pulling of the trigger by the index finger and middle finger of the operator, for a distance of about 1.25 inches. The range of motion for the index and middle fingers is ergonomically comfortable.

Figure 6:
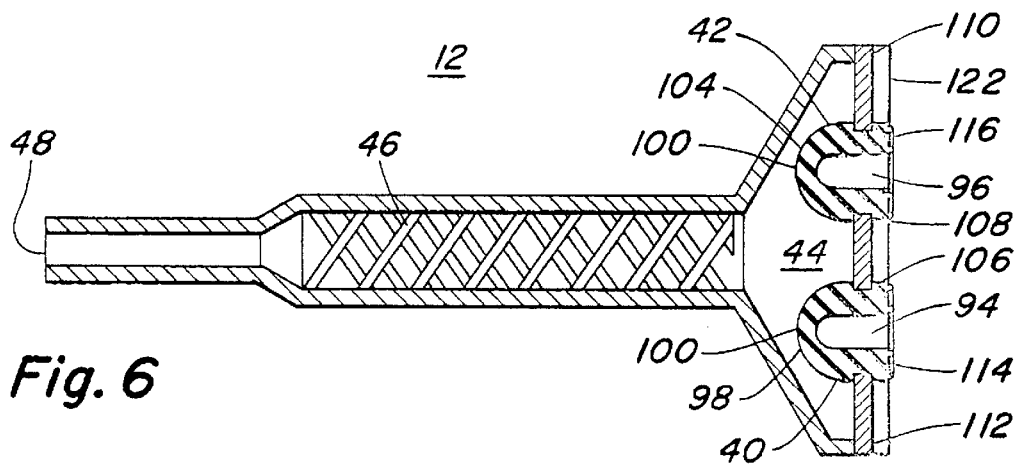
FIG. 6 is a schematic of the top section view of a nozzle and a dome-shaped one-way valve.
Figure 7:
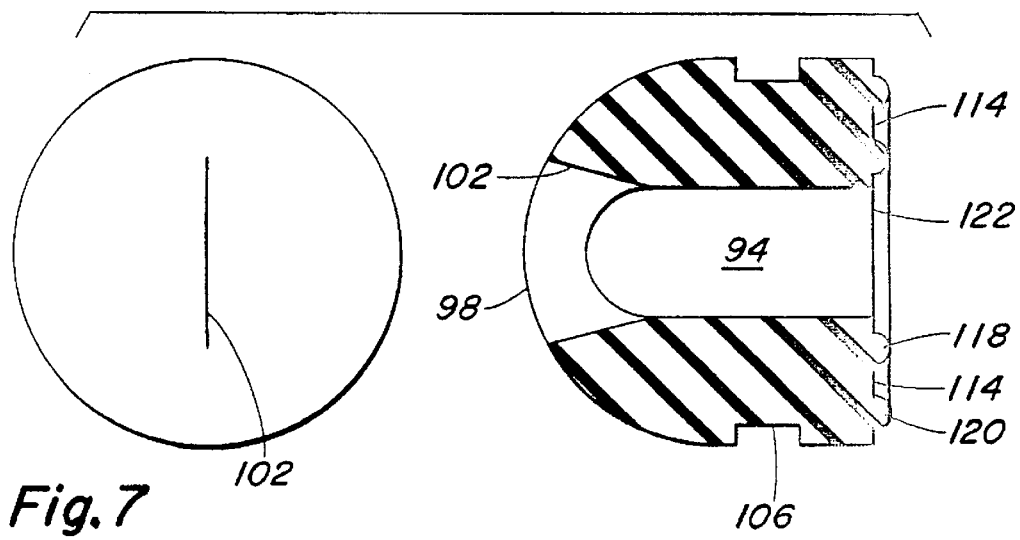
FIG. 7 is an enlarged side section view and an enlarged front view of the dome-shaped one-way valve.

FIG. 6 illustrates the nozzle attachment, 12, to the spray gun, 10 Each resin often at different pressures. e.g. 200 and 100 psi, is dispensed from its respective discharge opening, 72 and 92, (see FIG. 1) of the spray gun, 10, into its respective inner cavity, 94 and 96, of its one-way valve, 40 and 42, (see FIG. 1) in the nozzle The preferred embodiment of the one-way valve is identical dome-shaped structures, 40 and 42. At the vertex, 98 and 100, of each dome-shaped valve is a straight slit, 102 and 104, approximately three sixteenth of an inch long (shown in FIG. 7). The ratio of the diameter of each inner cavity, 94 and 96, to the outer diameter of each dome is 1:3 The principle of operation of the identical one-way valves having a straight slit is the differences in internal and external resin pressure on the valves. When either of the one-way valves is pressurized internally by the pressure of either resin "A" and/or "B", the cavity expands, the slit opens and the resin flows from the cavity of the valve into the mixing chamber, 44, of the nozzle. If the resin pressure on the exterior of one of the one-way valve is greater than the internal pressure within the valve cavity, the valve contract and the slit closes. This prevents any of the resins from outside the valve to pass inside either valve. In other words, each valve with slit acts as a one-way valve and prevents crossovers. i.e., contamination of either resin by the other within the valve cavity and possibly hardening of the resin.

Each valve has a circular notch, 106 and 108, on the outside of the valve for placement and mounting of the valve onto the nozzle wall. 110 and 112 (see FIG. 6). On the exterior of the in, 114 and 116, of each valve is at least one circular ridge, 118 and 120. A ridge is between 0.020 and 0.040 inches in depth and extends beyond the attachment end, 122, of the nozzle. When the nozzle attaches to the spray gun, FIG. 10, the ridges are pressed against the flat front, 124, of the gun, thereby preventing leakage of the resins from the point of connection of the nozzle and the spray gun. The ratio of the length of each slit, 102 and 104, to its rim, 114 and 116, is approximately 1:2.

Another embodiment of the one-way valve, (shown in FIGS. 8 and 9) is a rigid plate, 126, having two holes, 125 and 127, and fitting snugly at the end, 122, of the nozzle. The plate is approximately one-sixteenth of an inch thick. Two semi-circular openings, 128 and 130, are cut into and through a rubber sheet, 132, for the passage of each resin therethrough and into the mixing chamber of the nozzle, FIG. 9. The two circular openings are approximately one eighth of an inch in diameter. The size of the flap is larger than the its respective hole in the rigid plate. The two flaps are one-way valves that work in the same manner as the dome-shaped one-way valves.

Figure 10:
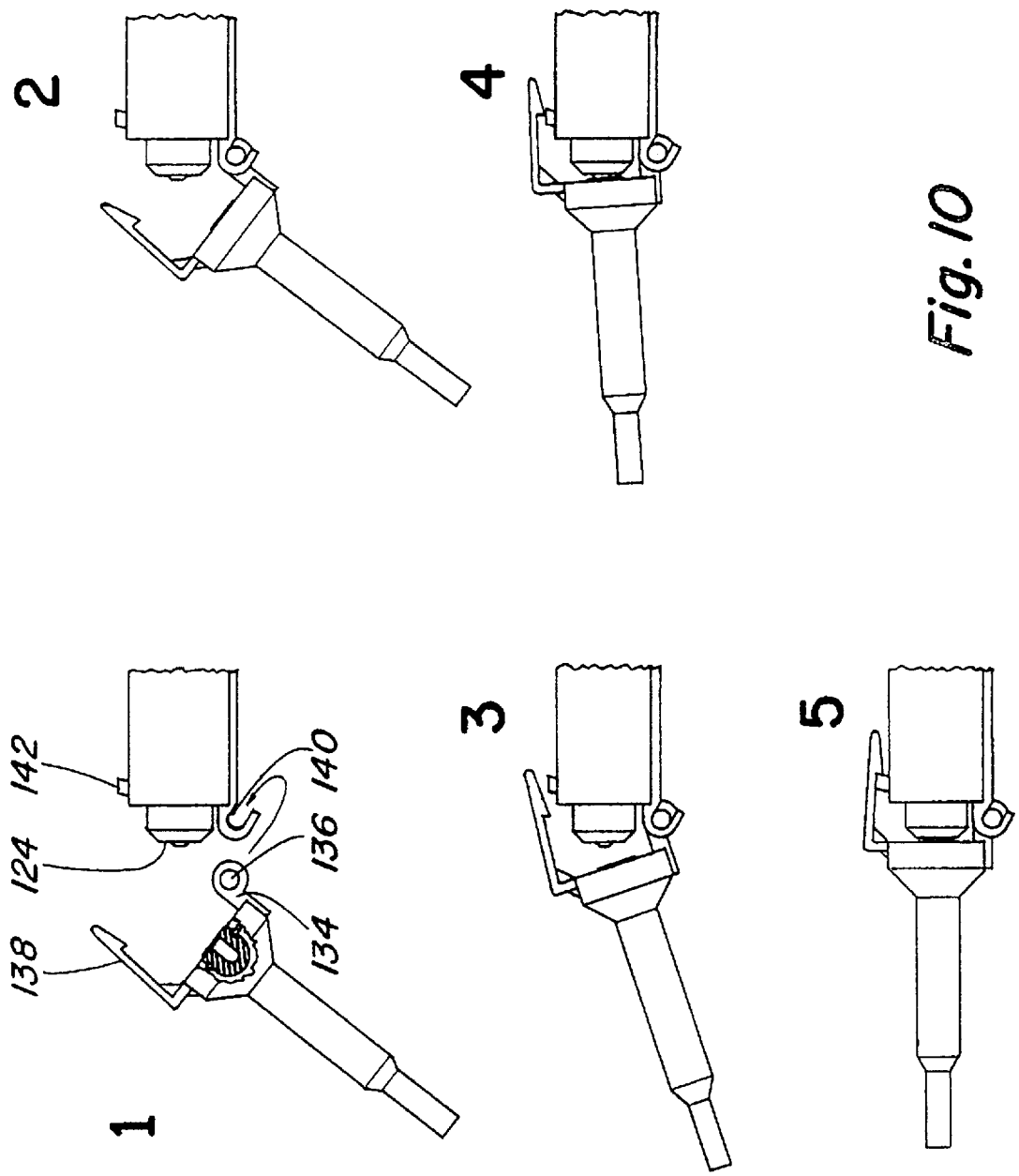
FIG. 10 is the method of attachment of tie nozzle to the spray gun.

FIG. 10 illustrates the method of attachment of the nozzle, 12, to the spray gun. 10. On the nozzle there is a leg, 134, a pin, 136, and a latch, 138. On the spray gun, 10, there is a partial sleeve, 140, and a wall, 142. The method of attachment involves five steps. First, the pin, 136, of the nozzle fits into the partial sleeve, 140, of the gun. The cross section of the partial sleeve, 140, is greater than half a circle in order to maintain the pin within and the partial sleeve, 140 and, is slightly smaller in diameter than the diameter of the pin. Once the pin, 136, is within the sleeve, 140, a hinge is created. Second, the nozzle, 12, is rotated up and around the gun, 10. Third, the latch, 138, moves into position close to the wall 142. Fourth, the latch 138, rests on the wall. 142, Fifth, the latch, 138, is secured over the wall 142, in a locking position.

Figure 11:
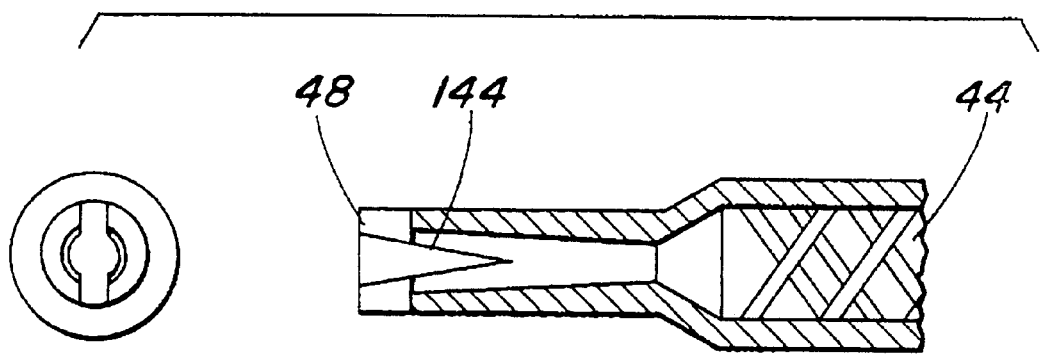
FIG. 11 is a side section view of a discharge tip of the nozzle for spraying foam in a cone-shape pattern.
Figure 12:
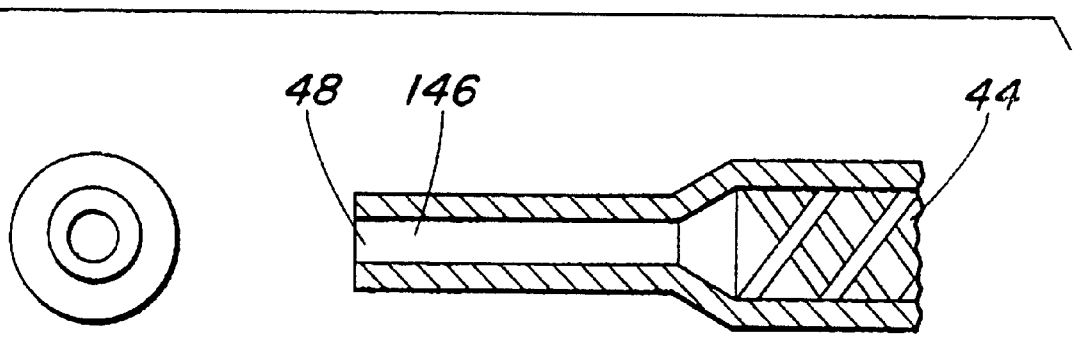
FIG. 12 is a side section view of the discharge tip of the nozzle for spraying foam or bead-shaped pattern.

There are at least three possible pattern for spraying the polyurethane foam from the dispenser opening, 48, of the nozzle. FIG. 11 illustrates the shape, 144, of the opening, 48, if a conical or fan-shaped spray and if a straight stream of spray is desired. FIG. 12 illustrates the shape, 146, of the opening if a narrow bead of foam is desired.

Figure 13:
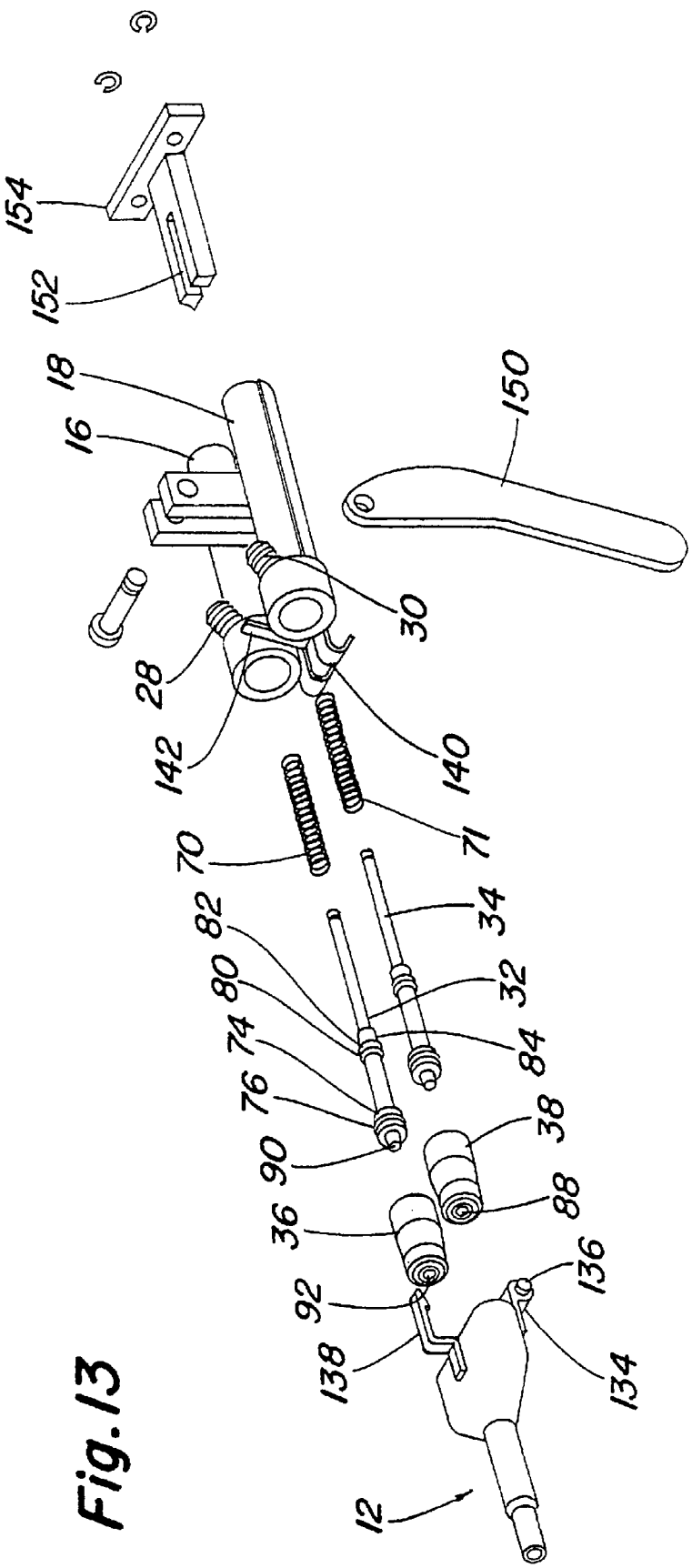
FIG. 13 is an exploded view of the spray gun and nozzle attachment.

FIG. 13 is an exploded view of the spray gun and nozzle attachment, 12. Pressurized resins "A" and "B" each enter barrels, 16 and 18, through inlet ports, 28 and 30. Within each barrel is plunger, 32 and 34. Around each plunger is a coiled metal spring, 70 and 71, which urges each plunger forward within each barrel to a closed position. A trigger, 150, fits into slot, 152, of plunger puller, 154. The plunger puller, 154, is secured to each plunger, 16 and 18. When trigger, 150, is compressed, plunger puller, 154, simultaneously withdraws each plunger, 16 and 18, thereby allowing each resin to pass into its barrel and then its metering chamber, 36 and 38. Within each metering chamber, 36 and 38, is a ramp-shaped slot. The further the plungers are withdrawn from the barrels the more exposed the ramp-shaped slots are to the resin thereby allowing more of each resin to pass out of each discharge opening, 88 and 92, and into the one-way valves (not shown) of the nozzle, 12. Around each plunger at the front end, 74, of each plunger is an O-ring, 76. When the plunger is in its most forward position, i.e., the trigger is in its natural position, the front O-ring, 74, prevents leakage of resin from the metering chamber discharge opening, 88. This front O-ring, also, increases control over the flow rate of the resin as the O-ring reaches and moves along the ramp-shaped slot At the mid-section, 84, of the plunger is placed at least one O-ring, 80 and 82, which prevent leakage of resin reward within the barrel, remembering that the resins are under pressure. The nose/tip of each plunger, 90, is conical/narrowed to fit within the conical/narrowed, discharge opening, 88, of the metering chamber, 36. On the exterior of the nozzle, 12, are a leg, 134, and a pin, 136, and a latch. 138. On the exterior of the gun is a partial sleeve and a wall, 142. Pin, 136, fits within the sleeve 140, to form a hinge which then allows the nozzle to rotate around the gun so that the latch is close to the wall. The latch, 140, on the nozzle snaps onto the wall 142, of the gun to securely attach he nozzle to the gun. The nozzles are disposable and easily attachable to the spray gun.

Experiment 1

In order to investigate the flow characteristics of resins "A" and "B", a prior art gun was modified. The disposable nozzle was removed from the gun. The safety plunger was pushed forward to close the gun's discharge tip. Two small holes (⅛ inch in diameter) were made oil the opposite sides of the gun barrels. Two small barbed fittings were fastened into each hole. Two pieces of flexible plastic tubes were connected to the free ends of the barbed fittings. The free ends of the flexible tubes were inserted into separate clear bottles.

For the low dispensing attempts, only resin "B", the resin with the lower viscosity, entered into a clear bottle. In other words, when the trigger of the gun was depressed slightly, resin "B" ran into its respective clear bottle. The clear bottle for resin "A" remained empty at the low dispensing rate. The resin flow characteristics through a prior art spray gun were tested twenty times. The results were consistent. At low dispensing rates, the viscosity difference in resins influenced the relative flow rates of the resins.

Experiment 2

The adjustments were made to the prior art gun as indicated in Experiment 1. For the high dispensing flow rates both resins entered into their respective clear bottles almost equally. In other words, when the trigger of the gun was depressed completely, both resins "A" and "B" ran into their respective clear bottles, almost equally in terms of their volumes. The resin flow characteristics through the modified prior art gun were tested twenty times. The same results were obtained. At high dispensing rates, the resin viscosity difference between the two resins did not effectively influence the relative volumetric flow of the two resins.

Experiment 3

Two prototypes were developed based on the concept of new foam dispensing gun designs. The first one was developed to examine the effectiveness of the metering chamber. This prototype includes two barrels with a rigidly attached nozzle. The nozzle has two identical one-way valves to prevent resin crossover. The valves were made from viton tubing segments, with each tubular segment capped at one end. The other end of each valve received each resin front the discharge ports. A longitudinal slit is cut on to the wall of each tubular segment. This slit cuts through the wall thickness, through which material can flow from inside the tubular segment to the mixing chamber of the nozzle. The plunger/needle were controlled or pulled back for dispensing independently. This was done to adjust the metering of each gun barrel for the respective viscosity of each resin. It was demonstrated that the metering concept works effectively for the entire range of dispensing, from very low to very high dispensing rates. The first gun/nozzle prototype that the metering concept worked at both low and high dispensing rates. This prototype did not have a trigger mechanism or handle. The plungers of the gun were pulled back by turning two independently nuts that were engaged with the threaded stems of the plungers.

Experiment 4

The second prototype gun was to have symmetric passage of the both resins. This prototype had a trigger mechanism, attachable/detachable nozzle and inlet ports on each gun barrel for each resin. The gun also had a grip handle for holding the gun, similar to the typical prior art. The nozzle portion also included the one-way valves for preventing resin crossovers, similar to prototype 1 above, Experiment 3.

To examine the effect of the resistance of the resin entrance port on the dispensing rate, the inner diameters of the resin entrance ports were reduced from ⅛ to ¹⁄₁₆ of an inch. The gun demonstrated excellent low dispensing characteristics. It was possible to trace alphabetical characters with foam discharging from the nozzle tip. The porosity of the foam was satisfactory compared to the foams of other guns. It was noticed that narrowing of the resin entrances reduced the maximum dispensing rate of the gun. It was recommended that the inner diameter of the inlet ports should by increased to ⅛ inch. Excellent mixing rates were obtained for both low and high dispensing rates.

The present invention has been described with a degree of particularity. It is the intent, however, that the invention includes all modifications and alterations from the disclosed inventions falling within the spirit or scope of the appended claims.

What is claimed is:

1. A dispensing gun enabling first and second liquid resins of dissimilar viscosity to be mixed together for subsequent discharge therefrom which comprises:
    a. a body having a trigger, a first and second longitudinally extending barrel, and a first and second longitudinally extending metering chamber forward of each of said barrels and secured thereto, whereby each of said first and second barrels and each of said first and second metering chambers provide continuous first and second longitudinally extending passageways for connection to a common mixing chamber, wherein said first and second passageways are defined by continuous first and second bores of said barrels and said metering chambers leading to said common mixing chamber, wherein within said passageways are a first and second inlet port connected to sources of said first and second resin, and wherein within said first and second passageways are a first and second movable plunger to individually meter said first and second resin,
    b. a spring around each of said first and second plungers to urge said first and second plunger to a closed position, and
    c. at least one ramp-shaped slot disposed into each metering chamber of said first and second bores to provide a variable flow rate of each resin to said common mixing chamber upon movement of said plungers for controlled metering of said resins when the trigger is actuated.

2. The dispensing gun according to claim 1, further including a second slot disposed into each of said first and second inner bores for controlled metering of each metering chamber of said resins to be discharged from discharge openings of said metering chambers.

3. The dispensing gun according to claim 2, wherein said slots in each passageway are staggered.

4. The dispensing gun according to claim 3, wherein each of said slots is selected from the group consisting of having a variable height—a constant width, and a variable height—a variable width.

5. The dispensing gun according to claim 2, wherein each of said first slots is longer than each of said second slots for controlled metering of each of said resins.

6. The dispensing gun according to claim 2, wherein each of said discharge openings is conical to prevent air and moisture from contacting said resins and hardening said resins within said passageways when said gun is not in use.

7. The dispensing gun according to claim 6, wherein each of said plungers has a conical-shaped tip to fit within each of said first and second conical discharge openings.

8. The dispensing gun according to claim 2, wherein each of said second slots is selected from the group consisting of being axially straight and rifled with respect to each of said metering chambers.

9. The dispensing gun according to claim 1, wherein each of said first slots is selected from a group consisting of being axially straight and rifled with respect to each of said metering chambers.

10. The dispensing gun according to claim 1, wherein each of said plungers each have a first, a mid and a second section, wherein said first section of each of said plungers have an O-ring, wherein each of said O-rings have complete circumferential contact with said inner bores when said plungers are each in a closed position, and wherein each of said O-rings control metering of each of said resins when each of said plungers is in a dispensing position and each of said O-rings prevent leaking of each of said resins when each of said plungers is in a closed position.

11. The dispensing gun according to claim 10, wherein each of said plungers has an O-ring positioned at said mid-section to prevent rearward leakage of said resin.

12. The dispensing gun according to claim 1, wherein a nozzle attaches to said body for mixing and dispensing the product of said mixed resins, and wherein said nozzle contains two one-way valves to prevent crossover of said resins.

13. A nozzle attachment to a foam dispensing gun enabling first and second liquid resins of dissimilar viscosity to be mixed together for subsequent discharge therefrom, said foam dispensing gun comprising a body having a trigger, a first and second longitudinally extending barrel, and a first and second longitudinally extending metering chamber having a conical-shaped discharge opening and being disposed forward of each of said barrels and secured thereto, whereby each of said first and second barrels and each of said first and second metering chambers provide continuous first and second longitudinally extending passageways for connection to a common mixing chamber, wherein said first and second passageways are defined by continuous first and second bores of said barrels and said metering chambers leading to said common mixing chamber, wherein within said passageways are a first and second inlet port connected to sources of said first and second resin, and wherein within said first and second passageways are a first and second movable plunger each having a conical-shaped tip and being sealed in the passageway with at least one O-ring to individually meter said first and second resin, a spring around each of said first and second plungers to urge said first and second plungers to a closed position, and first and second ramp-shaped slots of dissimilar physical size and shape which are disposed in staggered relationship within each metering chamber of said first and second bores to provide a variable flow rate of each resin to said common mixing chamber upon movement of said plunger for controlled metering of said resins when the trigger is actuated, and said nozzle attachment including said common mixing chamber together with a pair of one-way valves to prevent crossover of the individual resins being mixed.

14. A dispensing gun in combination with a nozzle enabling first and second liquid polyurethane foam resins of dissimilar viscosity to be mixed together for subsequent discharge therefrom which comprises:
    a body having a trigger, a first and second longitudinally extending barrel, and a first and second longitudinally extending metering chamber forward of each of said barrels and secured thereto, whereby each of said first and second barrels and each of said first and second metering chambers provide a continuous first and second longitudinally extending passageway for connection to a common mixing chamber, wherein said first and second passageways are defined by continuous first and second bores of said barrels and said metering chambers leading to said common mixing chamber, wherein within said passageways are a first and second inlet connected to sources of said first and second resins, and wherein within said first and second passageways are a first and second movable plunger to individually meter said first and second resin, b. a spring around each of said first and second plungers to urge said first and second plungers to a closed position, c. at least one ramp-shaped slot disposed in each metering chambers of said first and second bores to provide a variable flow rate of each resin to said common mixing chamber upon movement of said plunger for controlled metering of said resins when the trigger is actuated, and d. a nozzle having an inlet opening for receiving each of said resins from said gun which includes an outlet opening for discharging the mixed polyurethane foam resins, a pair of one-way valves to prevent crossover of the individual resins, and said common mixing chamber.

15. The combination according to claim 14, wherein each of said one-way valves is a dome-shaped one-way valve having a cylindrical cavity, a slit through a vertex of each of said domes and a rim.

16. The combination according to claim 15, wherein said one-way valves have a circumferential groove for mounting each of said one-way valves within said nozzle.

17. The combination according to claim 15, wherein each of said one-way dome-shaped valve rims has a ridge to form a seal between said nozzle and said gun to prevent leakage of said resins.

18. The combination according to claim 14, wherein each of said one-way valves is positioned through a rigid strip having two semi-circular flaps and securely positioned within said inlet opening.

19. The combination according claim 14, wherein said nozzle further including a leg having pin and a latch, wherein said gun further including a partially open sleeve and a wall, and wherein said pin fits within said sleeve to form a hinge and said latch snaps over said wall to firmly secure said nozzle to said gun.

20. The combination according to claim 14, wherein said resins have a different viscosity and wherein said ramp-shaped slot containing said resin having a greater viscosity contains more of said resin than said ramp-shaped slot containing said other resin.

* * * * *